(12) United States Patent
Madhuchandra et al.

(10) Patent No.: US 12,291,172 B2
(45) Date of Patent: May 6, 2025

(54) VEHICLE WINDSHIELD WIPER DEVICE

(71) Applicant: Volvo Truck Corporation, Gothenburg (SE)

(72) Inventors: K S Madhuchandra, Bangalore (IN); K S Sudeendra Thirtha Koushik, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/468,791

(22) Filed: Sep. 18, 2023

(65) Prior Publication Data

US 2024/0101069 A1 Mar. 28, 2024

(30) Foreign Application Priority Data

Sep. 23, 2022 (EP) .................................. 22197451

(51) Int. Cl.
*B60S 1/04* (2006.01)
*B60S 1/34* (2006.01)

(52) U.S. Cl.
CPC ........... *B60S 1/0469* (2013.01); *B60S 1/0458* (2013.01); *B60S 1/34* (2013.01); *B60S 1/3425* (2013.01); *B60S 1/3427* (2013.01); *B60S 1/3488* (2013.01); *B60S 1/3429* (2013.01); *B60S 1/3431* (2013.01)

(58) Field of Classification Search
CPC ........ B60S 1/3497; B60S 1/34; B60S 1/3479; B60S 1/3413; B60S 1/0455; B60S 1/0458; B60S 1/0469; B60S 1/0463; B60S 1/3425; B60S 1/3429; B60S 1/3431; B60S 1/3427

USPC ....................... 15/250.16, 257.01; 296/96.15
See application file for complete search history.

(56) References Cited

U.S. PATENT DOCUMENTS

| | | | | |
|---|---|---|---|---|
| 1,687,412 A | * | 10/1928 | White, Jr. ............. | B60S 1/0455 248/205.5 |
| 1,761,531 A | * | 6/1930 | Morris .................. | B60S 1/0491 15/250.19 |
| 2,284,844 A | * | 6/1942 | Rappl ................... | B60S 1/0455 15/250.19 |

(Continued)

FOREIGN PATENT DOCUMENTS

| | | |
|---|---|---|
| DE | 102013200003 A1 | 7/2014 |
| DE | 102016012314 A1 | 4/2018 |

(Continued)

OTHER PUBLICATIONS

Machine translation of description portion of German publication 102016012314, published Apr. 2018. (Year: 2018).*

(Continued)

*Primary Examiner* — Gary K. Graham
(74) *Attorney, Agent, or Firm* — Withrow & Terranova, PLLC

(57) ABSTRACT

A vehicle windshield wiper device comprising an articulated structure and a blade, the articulated structure comprising an arm transmitting mechanical forces to the blade, wherein the arm is mounted on an axle to provide an arm rotational movement corresponding to a wiping movement, wherein the arm is pivotably attached to the axle. The vehicle windshield wiper device also comprises an arm holder restraining the arm from pivoting when blade is in a parking position.

5 Claims, 4 Drawing Sheets

(56) References Cited

U.S. PATENT DOCUMENTS

| | | | | |
|---|---|---|---|---|
| 3,131,414 A | * | 5/1964 | Wise | B60S 1/38 |
| | | | | 15/250.32 |
| 3,390,416 A | * | 7/1968 | Scinta | B60S 1/3801 |
| | | | | 15/250.32 |
| 4,141,102 A | * | 2/1979 | Lawrence | B60S 1/0466 |
| | | | | 15/250.19 |
| 2011/0146021 A1 | | 6/2011 | Schrader | |

FOREIGN PATENT DOCUMENTS

| | | | |
|---|---|---|---|
| GB | 1416838 | * | 12/1975 |
| JP | H1134807 A | | 2/1999 |

OTHER PUBLICATIONS

European Search Report for European Patent Application No. 22197451.2, completed Feb. 15, 2023, 3 pages.

\* cited by examiner

VEHICLE WINDSHIELD WIPER DEVICE

RELATED APPLICATIONS

The present application claims priority to European Patent Application No. 22197451.2, filed on Sep. 23, 2022, and entitled "VEHICLE WINDSHIELD WIPER DEVICE," which is incorporated herein by reference in its entirety.

TECHNICAL FIELD

The invention relates to a vehicle windshield wiper device.

The invention can be applied in heavy-duty vehicles, such as trucks, buses and construction equipment. The invention is not restricted to this particular vehicle but may also be used in other vehicles such as car.

BACKGROUND

On a medium duty or heavy-duty truck, windshield is usually at a high level. It is then uncomfortable and/or difficult to access the windshield, for example in case of a maintenance issue or to clean it when the truck is stationary. To help the user/driver to access the windshield, foldable steps and/or grab handles are provided on the truck front. Grab handles are usually attached on the truck front just below the windshield. At same time, a windshield wiper device is mounted on the truck front, but grab handles limit space available below the windshield to attach the windshield wiper device. In the stationary position, wiper arms need to stay above the grab handles. In that position, wiper blades occupy a bottom area of the windshield and then reduce driver visibility.

SUMMARY

An object of the invention is to provide a vehicle windshield wiper device that could be also used as a handle to access the vehicle windshield.

The object is achieved by a vehicle windshield wiper device comprising an articulated structure and a blade, in which the articulated structure comprises an arm transmitting mechanical forces to the blade, the arm is mounted on an axle to provide an arm rotational movement corresponding to wiping movement, the arm is pivotably attached to the axle, and the windshield wiper device also comprises an arm holder that restrains the arm from pivoting when the blade is in a parking position.

By restraining pivoting movement of the arm when the blade is in the parking position, the arm could be grabbed by a user to climb on the vehicle.

According to one embodiment, the arm holder comprises a rigid bracket restraining the arm from pivoting when the blade is in the parking position.

According to a further embodiment, the arm holder comprises a rigid pin linked with a rigid bracket and arranged to cooperate with a corresponding hole made in the arm.

According to a further embodiment, the arm holder is located below the vehicle windshield.

According to a further embodiment, the arm holder comprises an electrically operated pin arranged to cooperate with a corresponding hole made in the arm and having a first position restraining arm from pivoting when blade is in parking position and a second position allowing pivotal movement of the arm.

According to a further embodiment, the arm comprises a handling section.

According to a further embodiment, handling section is located between the arm holder and an axle.

Further advantages and advantageous features of the invention are disclosed in the following description and in the dependent claims.

BRIEF DESCRIPTION OF THE DRAWINGS

With reference to the appended drawings, set out below is a more detailed description of embodiments of the invention cited as examples.

In the drawings.

DETAILED DESCRIPTION

Figure 1:
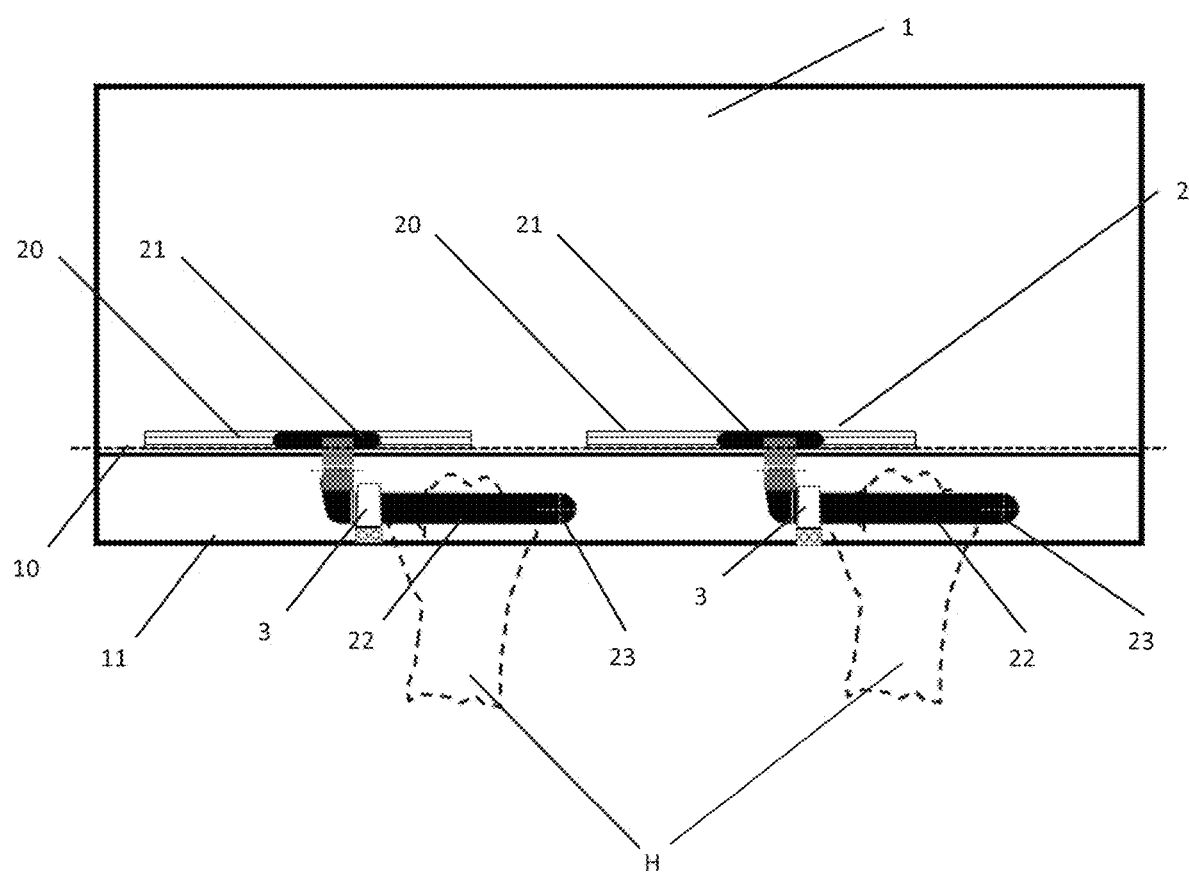
FIG. 1 is a schematic view of a vehicle windshield equipped with a wiper device.

It should be noted that in the detailed description that follows, identical or similar components, either from a structural and/or functional point of view, may have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped", or "set" or any equivalent or similar term is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

In addition, when the term "substantial" or "substantially" is used herein, it has to be understood as encompassing an actual variation of plus or minus 5% with respect to an indicated reference value, or axis, or position, and when the terms "transversal" or "transversally" are hereby used, they have to be understood as encompassing a direction non-parallel to the reference part(s) or direction(s)/axis they refer to, and perpendicularity has to be considered a specific case of a transverse direction.

Finally, in the following description and claims, the numeral ordinals first, second, et cetera . . . , will be used only for the sake of clarity of description and in no way should be understood as limiting for whatsoever reason, nor that the order should be necessarily the one described in the illustrated exemplary embodiment(s).

With reference to FIG. 1, a windshield 1 of a vehicle such as a truck is substantially rectangular. The windshield 1 is assembled on the structure (not shown) of the truck cab. In particular, the lower part of the windshield 1 is mounted on a front structure 11 of the truck cab.

In a manner known per se, the windshield 1 is equipped with a windshield wiper device 2. The windshield wiper device 2 comprises at least one blade 20 in contact with the windshield 1, and an articulated structure 21, 22 for transmitting a rotational movement to each blade 20. The rotational movement transmitted to each blade 20 allows each blade 20 to sweep at least part of the surface of the windshield 1.

The articulated structure comprises a rotating arm 22 mounted on the front structure 11 of the truck cab. The axis of rotation 23 of the rotating arm is located at a first end. The second end of the rotating arm 22 includes a mounting device 21 for the brush 20. This mounting device 23 is known per se and allows the brush 20 to be changed when worn or damaged. The axis of rotation 23 of the arm 22 is substantially perpendicular to the windshield 1 so that the brush 20 runs along at least part of the surface of the windshield 1. When the brush 20 is not rotating, it is in the so-called parking position. In this parking position, the brush 20 occupies a low area of the windshield 2 close to the front structure 11 of the truck cab.

The rotating arm 22 is also mounted so that it can pivot in relation to the windshield 1. The pivot axis of the rotating arm 22 is substantially parallel to the windshield 1. The pivoting of the rotating arm 22 allows the brush 20 to be moved away from the windshield 1, for example to replace the brush 20 or to clean the windshield 1. The pivot axis of the rotatable arm 22 is positioned on the first end.

According to a feature of the invention, the windshield wiper device 2 comprises a holding device 3 for the rotatable arm 22 preventing the rotatable arm 22 from pivoting when the blade 20 is in the parked position.

Figure 2:
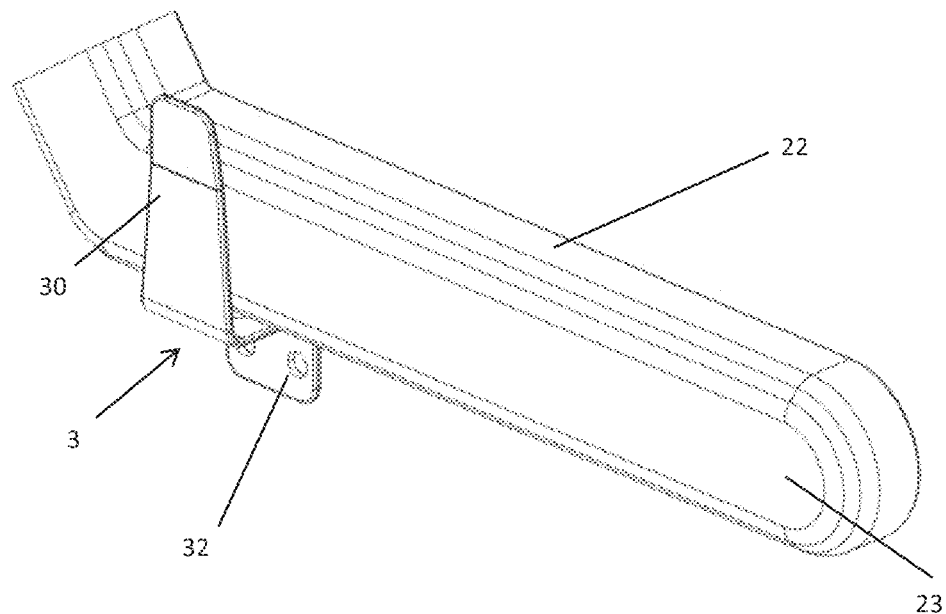
FIG. 2 is a front detail view of an articulated structure of the wiper device.
Figure 3:
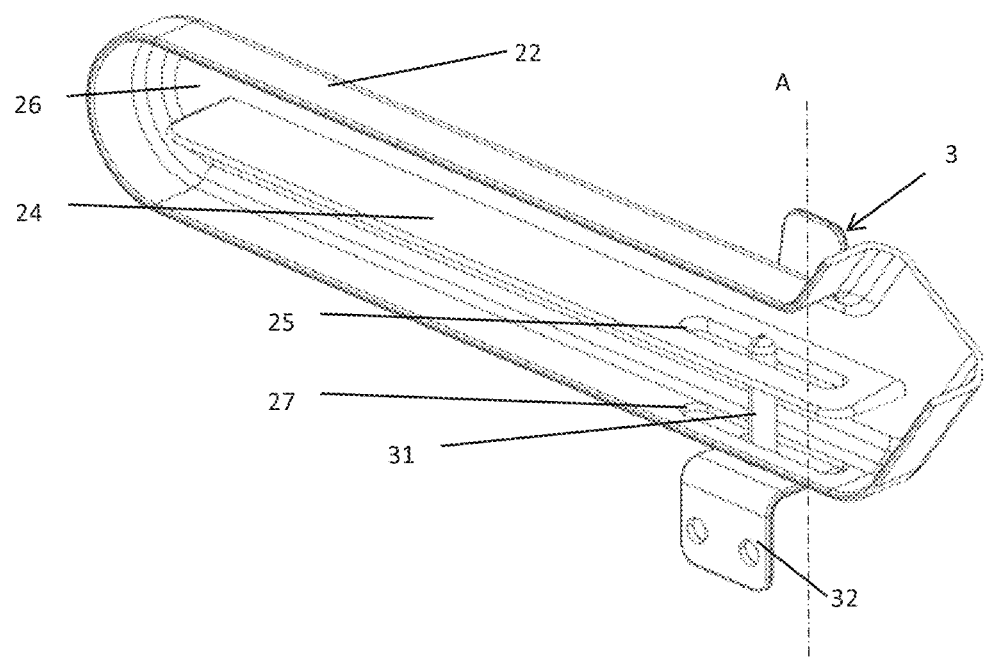
FIG. 3 is a rear detail view of the articulated structure of the wiper device.
Figure 4:
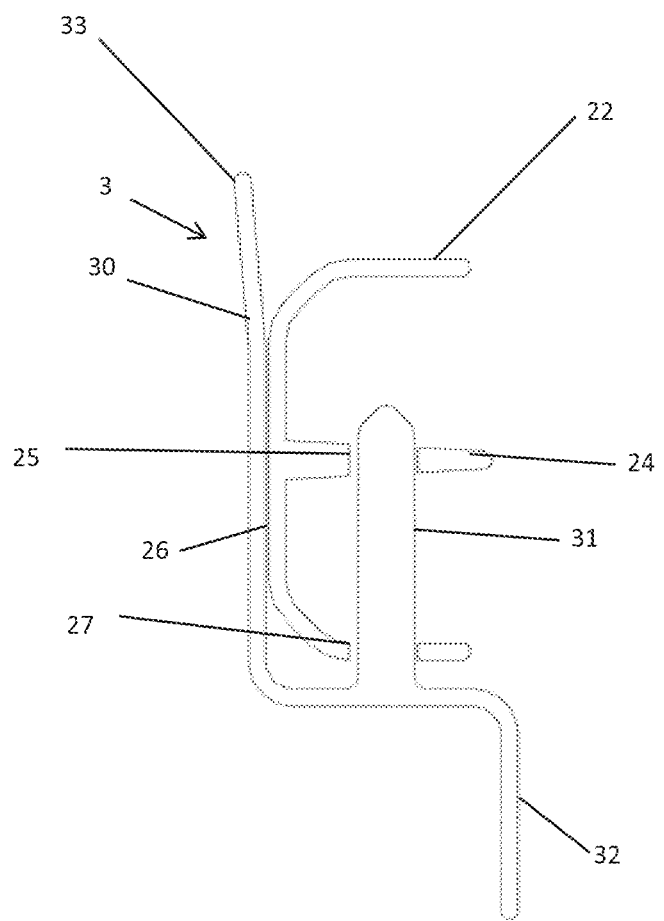
FIG. 4 is a sectional view of the articulated structure of the wiper device.

The holding device 3 will now be described in more detail with reference to FIGS. 2, 3 and 4. The holding device 3 comprises a rigid bracket 30 forming a stop for the rotating arm 22 when the rotating arm 22 is in the parked position. In other words, when the broom 20 is in the parked position, the rotating arm 22 is placed between the rigid bracket 30 and the front structure 11 of the truck cab so that the pivoting movement of the rotating arm 22 is no longer possible.

The holding device 3 also includes a bracket 32 for fixing the rigid bracket 30 to the front structure 11 of the truck cab. The attachment is made by screwing, welding or gluing. Thus, it is understood that when the broom 20 is in the parked position, a user H can grasp the rotating arm, for example, to climb onto the front of the truck without the rotating arm being able to pivot. The type of fastening is determined according to the front structure 11 of the truck cab and is able to support the weight of a user.

The holding device 3 may comprise a pin (or stud) 31 oriented substantially parallel to the longitudinal axis A of the rigid bracket 30. The pin 31 passes through the rotating arm 22 through a first hole 27 in the rotating arm 23 when the broom 20 is in the parked position. The rotating arm 22 may include a reinforcing rib 24 to increase the resistance of the rotating arm 22 to the weight of the user. The reinforcing rib 24 is located on an inner face 26 of the rotating arm 22. The reinforcing rib 24 may include a second hole 25 through which the pin 31 passes when the broom 20 is in the parked position. It is understood that the orientation of the pin 31, the first hole 27, and the second hole 25 does not prevent the rotation of the rotating arm 22, but does prevent the pivoting of the rotating arm 22.

A flared portion 33 is provided in the upper part of the rigid bracket 30, opposite the mounting tab 32. This flared portion 33 allows for better positioning of the rotatable arm 22 within the rigid bracket 30 in a parked position. A portion of the rotatable arm 22 may include a gripping device such as a handle (not shown). The portion of the rotating arm 22 comprising the gripping device is located between the axis of rotation 23 of the rotating arm 22 and the holding device 3.

According to the above embodiment, in the parked position the brush or brushes 20 are positioned in the lower part of the windshield. The rotating arm(s) 22 rest(s) in the rigid bracket 30. In this position, a user can grasp a rotating arm 22 with the user's hand H to access the windshield. No other handle is required. The space thus freed up allows for easier installation of the wiper device 2 so that the blade(s) 20 is/are positioned as low as possible on the windshield 1 and thus increases the user's viewing area through the windshield 1.

Figure 5A:
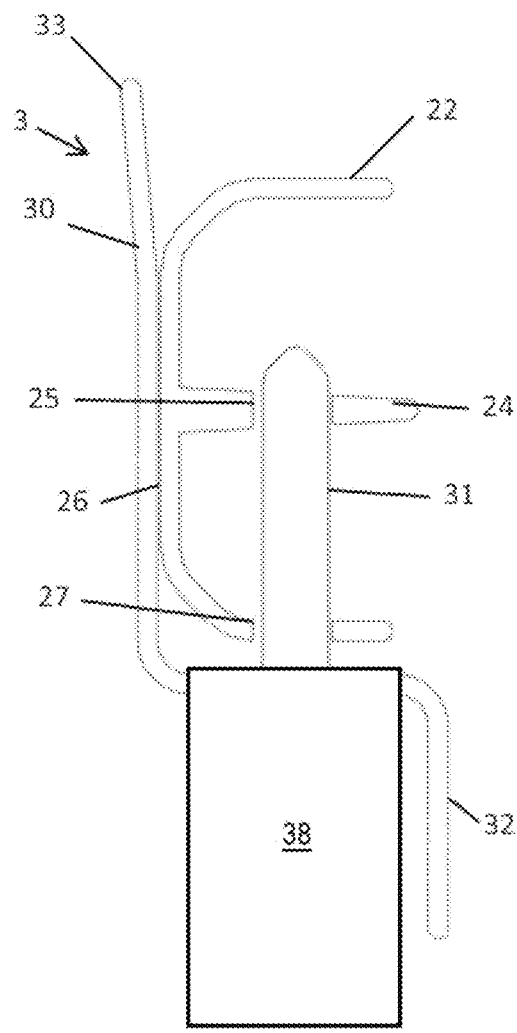
FIG. 5A is a sectional view of the articulated structure of the wiper device, with an electrically controlled actuator incorporating a pin in the form of a piston that is arranged in an extended position.
Figure 5B:
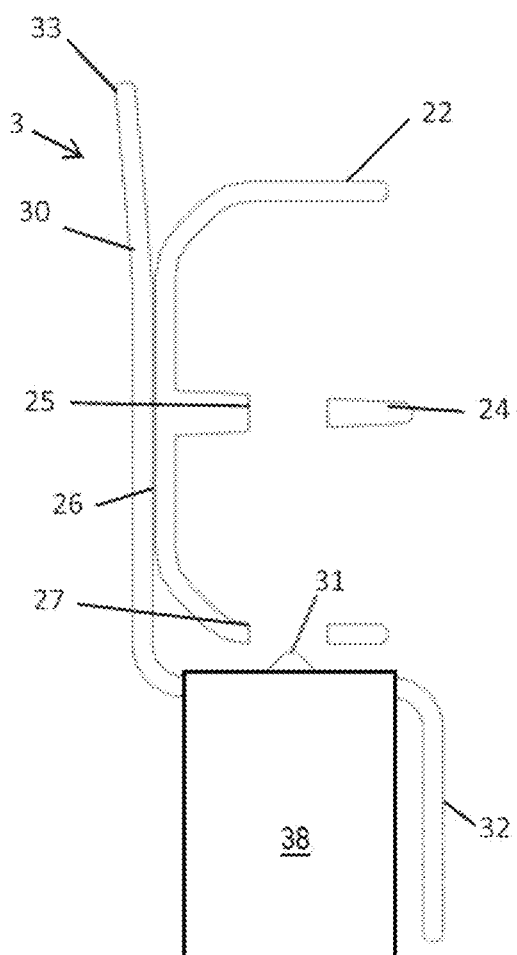
FIG. 5B is a sectional view of the items of FIG. 5A with the pin in the form of a piston that is arranged in a folded or retracted position.

According to another embodiment, the holding device comprises an electrically controlled actuator 38 such as shown in FIGS. 5A and 5B. The actuator 38 comprises a pin 31 comprising a piston or plunger and configured to move between an extended position (shown in FIG. 5A) and a retracted or folded position (shown in FIG. 5B). In the extended position as shown in FIG. 5A, the pin 31 interacts with the rotating arm 22 to block the pivotal movement. For example, to block the pivotal movement of the rotating arm 22, the pin 31 engages the first and/or second ports 25, 27 of the rotating arm 22. In the folded position as shown in FIG. 5B, the pin 31 no longer interacts with the rotating arm 22. The actuation of the pin 31 in the extended position is carried out, for example, when the truck's ignition is switched off.

The invention claimed is:

1. A vehicle windshield wiper device comprising:
an articulated structure and a blade;
wherein the articulated structure comprises an arm transmitting mechanical forces to the blade;
wherein the arm is mounted on an axle to provide an arm rotational movement corresponding to a wiping movement, the arm is formed with an inner face at least partially surrounded about an arm periphery by an arm flange portion, and the arm comprises a reinforcing rib extending away from the inner face;
wherein the arm is pivotably attached to the axle such that the blade is movable away from a windshield of a vehicle;
wherein the vehicle windshield wiper device further comprises an arm holder restraining the arm from pivoting away from the windshield when the blade is in a parking position; and
wherein the arm holder comprises a rigid pin linked with a rigid bracket of the arm holder and configured to cooperate with a first hole in the arm flange portion of the arm and a second hole in the reinforcing rib of the arm.

2. The vehicle windshield wiper device of claim 1, wherein the arm holder is located below the windshield.

3. The vehicle windshield wiper device of claim 1, wherein the arm further comprises a handling section.

4. The vehicle windshield wiper device of claim 3, wherein the handling section is located between the arm holder and the axle.

5. A vehicle windshield wiper device comprising:
an articulated structure and a blade;

wherein the articulated structure comprises an arm transmitting mechanical forces to the blade;
wherein the arm is mounted on an axle to provide an arm rotational movement corresponding to a wiping movement;
wherein the arm is pivotably attached to the axle such that the blade is movable away from the windshield;
wherein the vehicle windshield wiper device further comprises an arm holder restraining the arm from pivoting away from the windshield when the blade is in a parking position; and
wherein the arm holder comprises an electrically operated pin configured to cooperate with a corresponding hole defined in the arm, the electrically operated pin having a first position restraining the arm from pivoting when the blade is in the parking position, and having a second position allowing pivotal movement of the arm.

\* \* \* \* \*